(12) United States Patent
Hundemer

(10) Patent No.: US 10,382,824 B2
(45) Date of Patent: Aug. 13, 2019

(54) VIDEO PRODUCTION SYSTEM WITH CONTENT EXTRACTION FEATURE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 2 days.

(21) Appl. No.: 15/213,301

(22) Filed: Jul. 18, 2016

(65) Prior Publication Data
US 2017/0019713 A1     Jan. 19, 2017

Related U.S. Application Data

(60) Provisional application No. 62/194,173, filed on Jul. 17, 2015, provisional application No. 62/242,593, filed on Oct. 16, 2015.

(51) Int. Cl.
*H04N 7/10* (2006.01)
*H04N 21/4788* (2011.01)
(Continued)

(52) U.S. Cl.
CPC ......... *H04N 21/4788* (2013.01); *G11B 27/10* (2013.01); *H04N 21/23424* (2013.01);
(Continued)

(58) Field of Classification Search
CPC ............. H04N 21/812; H04N 21/4331; H04N 21/435; H04N 21/235; H04N 21/44222; H04N 21/25891
(Continued)

(56) References Cited

U.S. PATENT DOCUMENTS 7,895,619 B2 *  2/2011  Schaefer ................. H04N 5/76
                                                                    725/32
8,136,134 B2 *  3/2012  Strein ................. G08B 27/008
                                                                    725/32
(Continued)

OTHER PUBLICATIONS https://en.wikipedia.org/wiki/Meerkat_(app); Wikipedia Article on Meerkat (app); published May 29, 2015; retrieved Sep. 28, 2016.
(Continued)

*Primary Examiner* — Annan Q Shang
(74) *Attorney, Agent, or Firm* — McDonnell Boehnen Hulbert & Berghoff LLP

(57) ABSTRACT

In one aspect, an example method is disclosed. The method includes (i) receiving, by a first computing system, video content, wherein the received video content comprises at least a first element and a second element, wherein the first element is social media (SM) video content published by a SM user, and wherein the second element is content other than SM video content published by the SM user; (ii) extracting, by the first computing system, the first element from the received video content; (iii) generating, by the first computing system, video content that includes the extracted first element; and (iv) transmitting, by the first computing system, to a second computing system, the generated video content for presentation of the generated video content on the second computing system.

20 Claims, 7 Drawing Sheets

(51) Int. Cl.
    *H04N 21/234* (2011.01)
    *H04N 21/44* (2011.01)
    *H04N 21/61* (2011.01)
    *G11B 27/10* (2006.01)
    *H04N 21/845* (2011.01)

(52) U.S. Cl.
    CPC ... *H04N 21/44008* (2013.01); *H04N 21/6125* (2013.01); *H04N 21/8456* (2013.01)

(58) Field of Classification Search
    USPC .................................................. 725/32–36
    See application file for complete search history.

(56) References Cited

U.S. PATENT DOCUMENTS

| | | | |
|---|---|---|---|
| 9,456,230 B1* | 9/2016 | Bota | H04N 21/2365 |
| 9,635,079 B1* | 4/2017 | Bostick | H04L 65/4084 |
| 2004/0193723 A1* | 9/2004 | Kabatani | H04N 21/23412 709/231 |
| 2006/0200842 A1* | 9/2006 | Chapman | H04N 7/163 725/34 |
| 2008/0012988 A1* | 1/2008 | Baharav | H04N 5/2723 348/586 |
| 2008/0072261 A1* | 3/2008 | Ralston | G11B 27/034 725/62 |
| 2009/0177758 A1* | 7/2009 | Banger | G06Q 30/0241 709/219 |
| 2010/0115559 A1* | 5/2010 | Ellis | H04N 5/44543 725/53 |
| 2010/0121849 A1 | 5/2010 | Goeldi | |
| 2011/0040760 A1 | 2/2011 | Fleischman et al. | |
| 2011/0075992 A1* | 3/2011 | Mei | G06Q 30/02 386/249 |
| 2012/0163770 A1* | 6/2012 | Kaiser | H04N 21/44016 386/241 |
| 2012/0200973 A1* | 8/2012 | Shiraishi | H05K 1/0265 361/104 |
| 2013/0094590 A1* | 4/2013 | Laksono | H04N 19/44 375/240.25 |
| 2013/0268962 A1 | 10/2013 | Snider et al. | |
| 2013/0304818 A1 | 11/2013 | Brumleve et al. | |
| 2014/0040371 A1 | 2/2014 | Gurevich et al. | |
| 2014/0040494 A1* | 2/2014 | Deinhard | H04L 65/4084 709/231 |
| 2014/0059635 A1* | 2/2014 | Sirpal | G06F 3/017 725/131 |
| 2014/0125703 A1* | 5/2014 | Roveta | G06T 19/006 345/633 |
| 2014/0173424 A1* | 6/2014 | Hogeg | H04N 21/47205 715/255 |
| 2014/0229833 A1* | 8/2014 | Foote | G06F 17/30796 715/719 |
| 2014/0280564 A1* | 9/2014 | Darling | G06Q 50/01 709/204 |
| 2015/0032859 A1* | 1/2015 | Fletcher | G06Q 30/02 709/219 |
| 2015/0074735 A1* | 3/2015 | Herigstad | H04N 21/478 725/110 |
| 2015/0139615 A1* | 5/2015 | Hill | H04N 21/2743 386/285 |
| 2015/0297949 A1* | 10/2015 | Aman | G06F 16/70 348/157 |
| 2015/0309687 A1* | 10/2015 | Herigstad | H04N 21/4126 715/784 |
| 2015/0319510 A1* | 11/2015 | Ould Dellahy, VIII | H04N 21/234 725/32 |
| 2015/0358629 A1* | 12/2015 | Choi | H04N 19/70 375/240.02 |
| 2016/0057458 A1* | 2/2016 | Kaiser | G06F 3/048 725/32 |
| 2016/0105698 A1* | 4/2016 | Tang | G11B 27/10 725/14 |
| 2016/0293214 A1* | 10/2016 | Jones | G11B 27/036 |
| 2017/0069349 A1* | 3/2017 | Muyal | G06K 9/00718 |

OTHER PUBLICATIONS https://en.wikipedia.org/wiki/Periscope_(app); Wikipedia Article on Periscope (app); published May 26, 2015; retrieved Sep. 28, 2016.
https://about.tagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touchscreen-support-to-help-bring-twitter-to-tv/; Vidpresso Adds Photo, Touchscreen Support To Help Bring Twitter To TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants To Help TV Stations Put Your Tweets And Facebook Comments On Air; Frederic Lardinois; published May 7, 2012; retrieved Sep. 28, 2016.
https://techcrunch.com/2014/03/03/vidpresso-ads/; Ads To Broadcast TV; Ryan Lawler; published Mar. 3, 2014; retrieved Sep. 28, 2016.

* cited by examiner

| Story Title | Video Content Item Identifier | Duration | Script |
|---|---|---|---|
| STORY A | VCI ID A | 00:02:00:00 | SCRIPT A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | SCRIPT F |
| STORY G | | 00:01:30:00 | |
| STORY H | VCI ID H | 00:00:30:00 | |
| STORY I | VCI ID I | 00:00:30:00 | |

Figure 5

VIDEO PRODUCTION SYSTEM WITH CONTENT EXTRACTION FEATURE

RELATED DISCLOSURES

This disclosure claims priority to (i) U.S. Provisional Patent Application No. 62/194,173, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a first computing system, video content, wherein the received video content comprises at least a first element and a second element, wherein the first element is social media (SM) video content published by a SM user, and wherein the second element is content other than SM content published by the SM user; (ii) extracting, by the first computing system, the first element from the received video content; (iii) generating, by the first computing system, video content that includes the extracted first element; and (iv) transmitting, by the first computing system, to a second computing system, the generated video content for presentation of the generated video content on the second computing system.

In another aspect, an example non-transitory computer-readable medium is disclosed. The computer-readable medium has stored thereon program instructions that upon execution by a processor, cause performance of a first set of acts including (i) receiving, by a first computing system, video content, wherein the received video content comprises at least a first element and a second element, wherein the first element is social media (SM) video content published by a SM user, and wherein the second element is content other than SM content published by the SM user; (ii) extracting, by the first computing system, the first element from the received video content; (iii) generating, by the first computing system, video content that includes the extracted first element; and (iv) transmitting, by the first computing system, to a second computing system, the generated video content for presentation of the generated video content on the second computing system.

In another aspect, an example first computing system is disclosed. The first computing system is configured for performing a set of acts including (i) receiving, by the first computing system, video content, wherein the received video content comprises at least a first element and a second element, wherein the first element is social media (SM) video content published by a SM user, and wherein the second element is content other than SM content published by the SM user; (ii) extracting, by the first computing system, the first element from the received video content; (iii) generating, by the first computing system, video content that includes the extracted first element; and (iv) transmitting, by the first computing system, to a second computing system, the generated video content for presentation of the generated video content on the second computing system.

BRIEF DESCRIPTION OF THE DRAWINGS

FIG. 5 is a simplified block diagram of an example program schedule.

DETAILED DESCRIPTION

I. Overview

Figure 1:
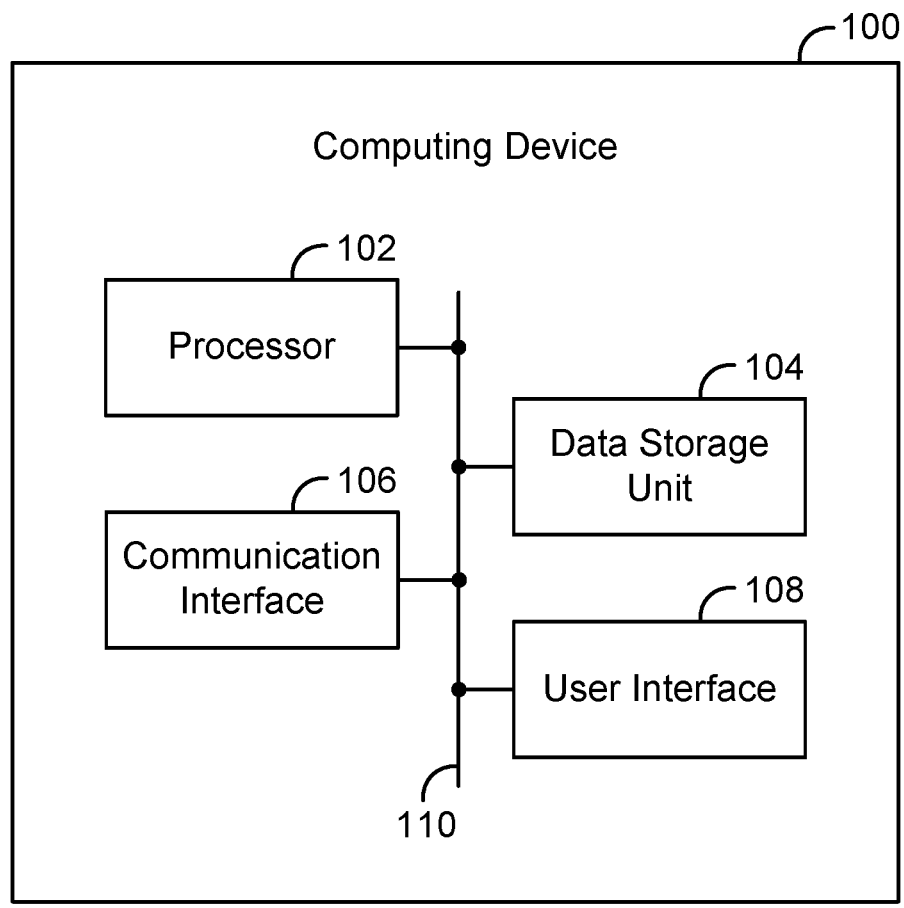
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a digital video-effect (DVE) system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

In one example, the VPS can also include a SM system and a character generator. The SM system can obtain SM video content, and the character generator can then use the SM video content to generate video content that includes the SM video content. Further, the character generator can transmit the video content to the DVE system. The DVE system can receive the video content and can execute a DVE, which causes the DVE system to generate video content that includes the received video content and thus, that also includes the SM video content. The generated video content can serve as or be part of a video program. Thus, in this way, the VPS can integrate SM video content into a video program.

As noted above, the VPS can receive SM video content and can integrate it to a video program. In some instances, a SM server can transmit the SM video content to the VPS by transmitting a data stream representing the SM video content to the VPS. As such, the VPS can receive the SM video content by receiving the data stream representing the SM video content.

In some instances though, the data stream can represent more than just the SM video content. For example, the data stream can also include an instruction configured to cause a computing system that receives the data stream to perform a particular operation, such as a content overlay operation.

Although the VPS can receive the entire data stream, in some instances, it can be desirable to integrate the represented SM video content, but not the overlay content, into a video program. This can help avoid certain undesirable situations. For example, if the overlay content is integrated in into the video program, it can potentially interfere with text or other content that may be overlaid on the video program by way of the DVE system executing a DVE. As such, to avoid this from happening, it can be desirable to integrate the SM video content, but not the overlay content, into the video program.

The VPS 202, the VBS 204, and/or components thereof can provide various acts and/or functions to allow the video content, but not the other content, to be integrated into the video program. First, the SM system can receive from a computing system associated with a SM platform, a data stream that includes a first portion and a second portion. The first portion can represent SM video content published by a SM user on the SM platform. The second portion can represent data other than SM content published by the SM user on the SM platform. The SM system can then extract the first portion from the received data stream.

After the SM system extract the first portion from the received video content, the VPS can then integrate the SM video content represented by the extracted first portion into a video program as discussed above. As such, the VPS can use the extracted first portion of the received data stream to generate video content that includes the represented SM video content. Further, the VBS can transmit the generated video content to the end-user device for presentation of the generated video content to an end-user of the end-user device as described above.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
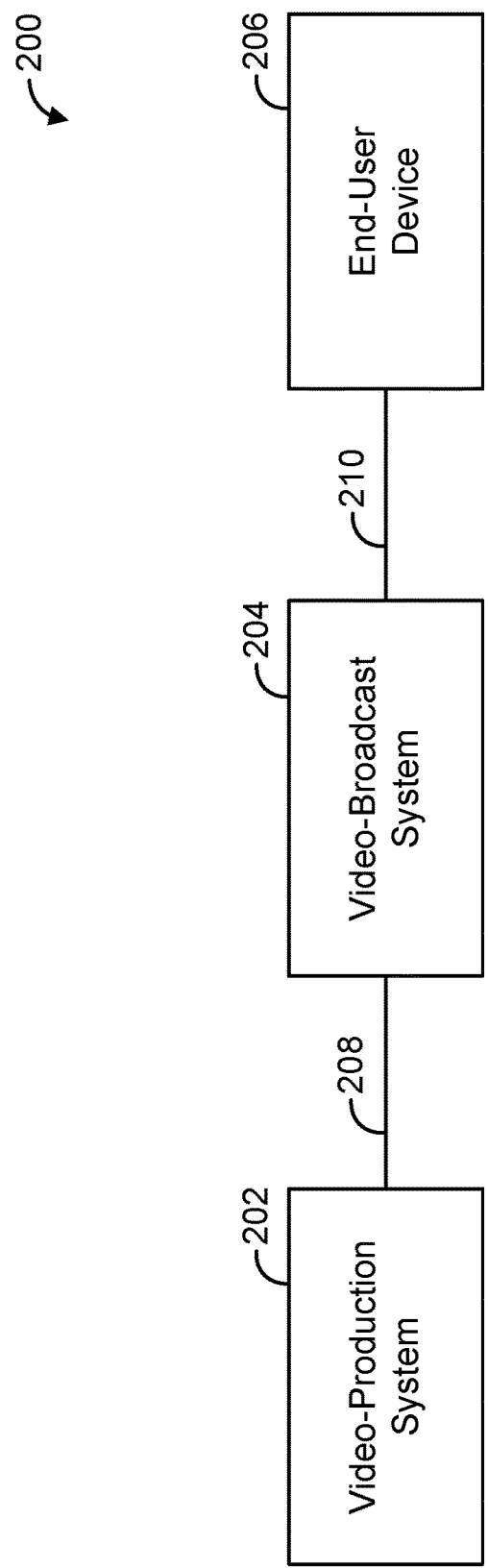
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
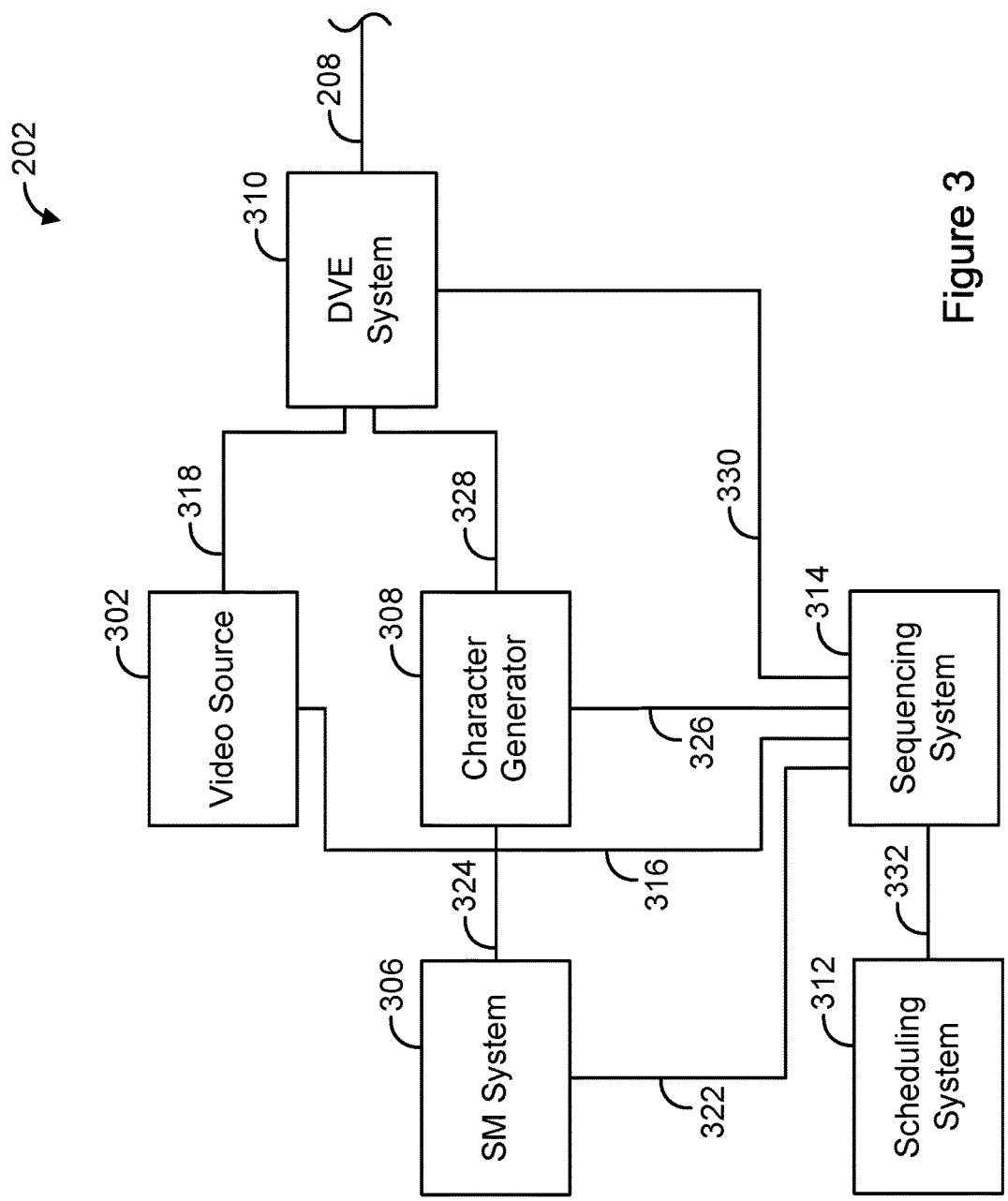
FIG. 3 is a simplified block diagram of an example video production system.

FIG. 3 is a simplified block diagram of an example VPS 202. The VPS 202 can include various components, such as a video source 302, a SM system 306, a character generator 308, a DVE system 310, a scheduling system 312, and a sequencing system 314, each of which can be implemented as a computing system. The VPS 202 can also include a connection mechanism 316, which connects the video source 302 with the sequencing system 314; a connection mechanism 318, which connects the video source 302 with the DVE system 310; a connection mechanism 322, which connects the SM system 306 with the sequencing system 314; a connection mechanism 324, which connects the SM system 306 with the character generator 308; a connection mechanism 326, which connects the character generator 308 with the sequencing system 314; a connection mechanism 328, which connects the character generator 308 with the DVE system 310; a connection mechanism 330, which connects the DVE system 310 with the sequencing system 314; and a connection mechanism 332, which connects the scheduling system 312 with the sequencing system 314.

The video source 302 can take various forms, such as a video server, a video camera, a satellite receiver, a character generator, or a DVE system. An example video server is the K2 server provided by Grass Valley of San Francisco, Calif.

The character generator 308 can take various forms. An example character generator is the VIZ TRIO provided by Viz Rt of Bergen, Norway. Another example character generator is CASPAR CG developed and distributed by the Swedish Broadcasting Corporation (SVT).

The DVE system 310 can take various forms, such as a production switcher. An example production switcher is the VISION OCTANE production switcher provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 314 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. These features and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the video source 302 can generate and/or output video content, and can transmit the video content to another entity, such as the DVE system 310. In practice, the VPS 202 is likely to include multiple video sources and corresponding connection mechanisms, each connecting a respective one of the video sources with the DVE system 310.

As noted above, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server 302 can then transmit the video stream, thereby transmitting the video content, to another entity, such as the DVE system 310.

The SM system 306 can perform various acts and/or functions related to SM content. In this disclosure, "SM content" is content that has been published on a SM platform, which is a computer-based tool that allows users to create, share, and/or exchange content (e.g., in the form of text, images, and/or videos) in virtual communities on a computer-based network such as the Internet. Examples of SM platforms include TWITTER, YOUTUBE, FACEBOOK, PERISCOPE, INSTAGRAM, MEERKAT, LINKEDIN, and GOOGLE+.

SM content has become a prominent and influential source of news and entertainment content. Indeed, SM platforms are more and more often a news-breaking source of information. It can thus be beneficial for video content providers to incorporate SM content items into a video program.

However, video content providers can encounter a number of technological challenges that make it difficult to incorporate SM content items into a video program. For example, receiving and integrating SM content items into a video program is generally a time-consuming and labor-intensive process using conventional computing systems and technology platforms. This can be particularly problematic in the context of a news program in which it may be beneficial to quickly receive and integrate SM content into the news program.

The VPS 202 can overcome these and other technological challenges. Among other things, the VPS 202 can provide technological solutions that allow SM content items to be received and integrated into a video program in an efficient and timely manner. The described technical solutions can also provide numerous other benefits, which will be apparent from this disclosure.

In line with the discussion above, the SM system 306 can receive SM content and can do so in various ways. For example, the SM system can receive SM content by obtaining it from another entity, such as a SM platform. In one example, the SM system 306 can obtain SM content directly from a SM platform. In another example, the SM system can obtain SM content from a SM platform via a SM dashboard application (e.g., TWEETDECK, CYFE, or HOOTSUITE). In some instances, a SM dashboard application can provide additional searching and browsing functionalities (e.g., based on trend analysis or analytics) that may not be provided by the SM platform itself, and/or can provide access to multiple SM platforms through a single user interface.

SM content can include various elements such as (i) data indicating the SM platform from which the SM content was received, (ii) data identifying the publisher of the SM content (e.g., an account identifier, such as a username), (iii) a profile image corresponding to the publisher of the SM content, (iv) text published by the publisher in connection with the SM content, (v) an image published by the publisher in connection with the SM content, (vi) audio content published by the publisher in connection with the SM content, (vii) video content published by the publisher in connection with the SM content, (viii) a timestamp indicating a time and/or date at which the SM content was published on the SM platform, (ix) a location (e.g., represented by global positioning system (GPS) coordinates) of the publisher when the SM content was published, (x) a location at which an aspect of the SM content occurred (e.g., where video content was recorded or where a photograph was taken), (xi) a timestamp indicating when an aspect of the SM content occurred, (xii) a number of other users associated with the publisher on a SM platform (e.g., a number of friends or followers), (xiii) an indication of how long the publisher has been a user of a SM platform, (xiv) a number of times the SM content has been shared (e.g., retweeted) by other users of a SM platform, (xv) a number of posts by the publisher on a SM platform, and/or (xvi) any other data that can be integrated into a video program.

In this disclosure, SM content that takes the form of video content is referred to as SM video content. In some cases, SM video content can be video content that is captured by a video capturing device of a mobile device or of another computing system associated with a SM user who published the video content on the SM platform. In some cases, the SM user can use the mobile device to capture the video content, and, at or about the same time that the video content is being captured (i.e., without significant delay), can transmit the captured video content to the SM server. This is sometimes referred to in the industry as a live video transmission or a live video stream.

The SM system can store, select, and/or retrieve SM content, perhaps based on input received from a user (e.g., a producer or technical director) via a user interface. As such, the SM system 306 can store an obtained SM content item in a data storage unit (e.g., a data storage unit of the SM system 306), and can then receive the SM content by selecting and retrieving it from the data storage unit.

The SM system 306 can also transmit SM content to another entity, such as the character generator 308. In one example, the SM system 306 can retrieve stored SM content and can then transmit the retrieved SM content to the character generator 308.

The SM system 306 can also receive SM content from a SM server (or other computing system associated with the SM platform on which the SM content was published) and can then forward the received SM content to the character generator. Notably, even when the SM system 306 transmits SM content in this manner, the SM system 306 can still store and/or retrieve the SM content as part of this process. For instance, the SM system 306 can store the SM content in, and can retrieve it from, a memory buffer to facilitate the receipt and transmission of the SM content.

The character generator 308 can use a character generator template and content to generate and/or output video content that includes the content. The character generator template specifies the manner in which the character generator 308 uses the content to generate and/or output the video content. The character generator 308 can create and/or modify a character generator template, perhaps based on input received from a user via a user interface. Further, the character generator 308 can store, select, and/or retrieve a character generator template, perhaps based on input received from a user via a user interface. As such, the character generator 308 can store a character generator template in a data storage unit (e.g., a data storage unit of the character generator 308), and can then receive the character generator template by retrieving it from the data storage unit.

The character generator 308 can also receive content in various ways. For example, the character generator 308 can receive content by receiving it from another entity, such as the SM system 306. In another example, the character generator 308 can receive content by selecting and retrieving it from a data storage unit (e.g., a data storage unit of the SM system 306).

The character generator template can specify how the character generator 308 is to receive content. In one example, the character generator template can do so by specifying that the character generator 308 is to receive content on a particular input of the character generator 308 (e.g., an input that maps to a particular entity, such as the SM system 306). In another example, the character generator template can do so by specifying that the character generator 308 is to receive content by retrieving it from a particular location of a particular data storage unit (e.g., a data storage unit of the character generator 308).

In one example, the character generator 308 can use an ordered set of content items to generate video content that includes the content items in the specified order. This type of generated video content is sometimes referred to in the industry as a "ticker." The content items can include various types of content, such as text and/or images. In one example, each of these content items can be SM content. The ordered set of content items can be stored in various forms, such as in the form of an Extensible Markup Language (XML) file.

After the character generator 308 generates and/or outputs video content, the character generator 308 can transmit the video content to another entity, such as the DVE system 310, and/or can store the video content in a data storage unit (e.g., a data storage unit of the character generator 308).

As such, in one example, the character generator 308 can receive SM content, can use the SM content to generate and/or output video content that includes the SM content, and can transmit the video content to the DVE system 310.

The DVE system 310 can use a DVE template to generate and/or output video content. This is sometimes referred to in the industry as the DVE system "executing a DVE." In some instances, the DVE system 310 can execute multiple DVEs in serial or overlapping fashion.

The DVE template specifies the manner in which the DVE system 310 generates and/or outputs video content. The DVE system 310 can create and/or modify a DVE template, perhaps based on input received from a user via a user interface. Further, the DVE system 310 can store and/or retrieve a DVE template, perhaps based on input received from a user via a user interface. As such, the DVE system 310 can store a DVE system template in a data storage unit (e.g., a data storage unit of the DVE system 310), and can then receive the DVE template by selecting and retrieving it from the data storage unit.

In some instances, the DVE system 310 can use the DVE template and content to generate and/or output video content that includes the content. The DVE system 310 can receive content in various ways. For example, the DVE system 310 can do so by receiving it from another entity, such as the video source 302 and/or the character generator 308. In another example, the DVE system 310 can do so by selecting and retrieving it from a data storage unit (e.g., a data storage unit of the DVE system 310).

The DVE template can specify how the DVE system 310 is to receive content. In one example, the DVE template can do so by specifying that the DVE system 310 is to receive content on a particular input of the DVE system 310 (e.g., an input that maps to a particular entity, such as the video source 302 or the character generator 308). In another example, the DVE template can do so by specifying that the DVE system 310 is to receive content by retrieving it from a particular location of a particular data storage unit (e.g., a data storage unit of the DVE system 310).

A DVE template can be configured in various ways, which can allow the DVE system 310 to execute various types of DVEs. In one example, a DVE template can specify that the DVE system 310 is to receive video content from the video source 302 and other content (e.g., local weather content) from a data storage unit of the DVE system, and is to overlay the other content on the video content, thereby generating a modified version of the video content. As such, in one example, the DVE system 310 can generate video content by modifying video content.

Figure 4A:
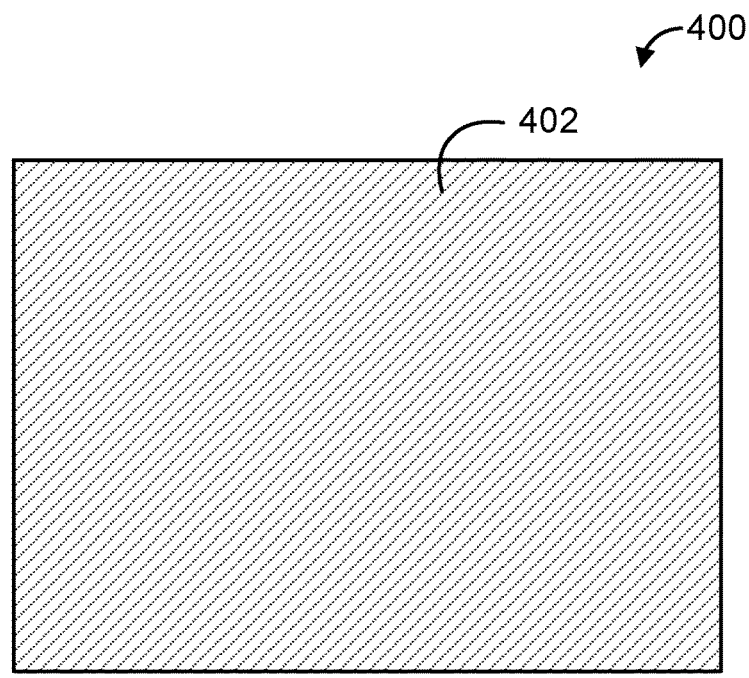
FIG. 4A is a simplified diagram of an example frame of video content, without content overlaid thereon.
Figure 4B:
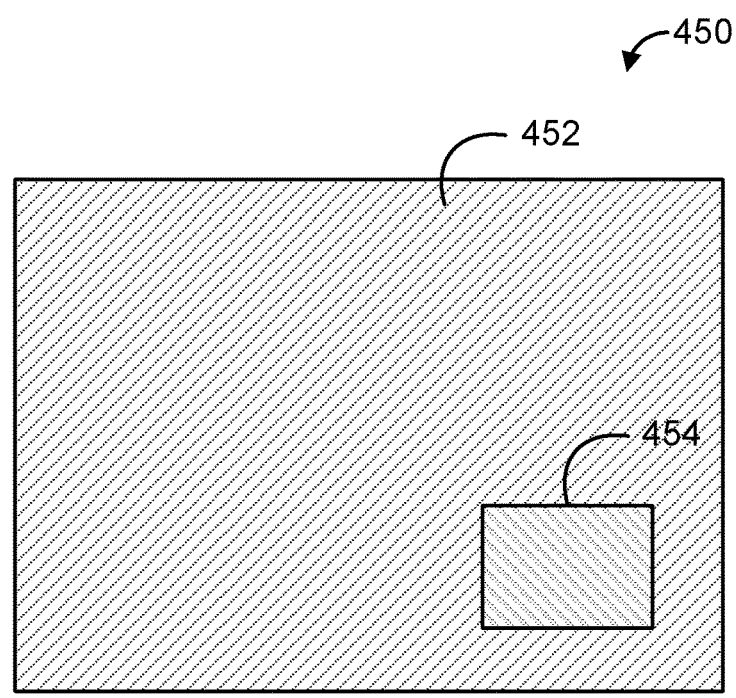
FIG. 4B is a simplified diagram of an example frame of video content, with content overlaid thereon.
Figure 6:
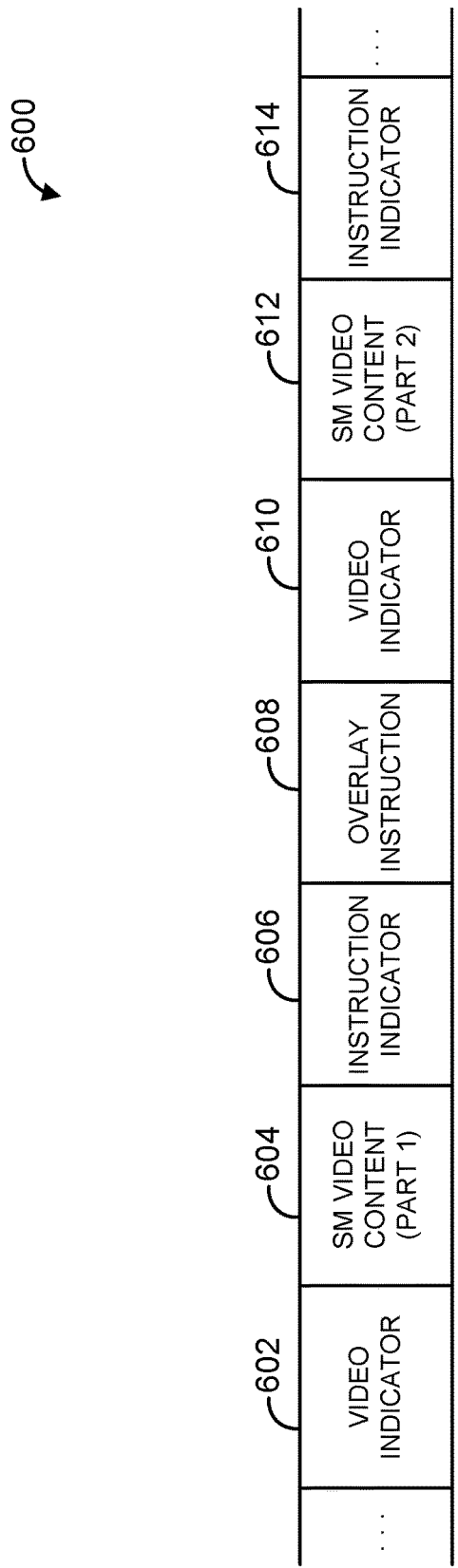
FIG. 6 is a simplified diagram of an example data stream.

FIGS. 4A and 4B help illustrate this concept of overlaying other content on video content. FIG. 4A is a simplified depiction of an example frame 400 of video content. Frame 400 includes content 402, but does not include other content overlaid on content 402. For comparison, FIG. 4B is a simplified depiction of another example frame 450 of video content. Frame 450 includes content 452 and other content 454 overlaid on content 452.

In another example, a DVE template can specify that the DVE system 310 is to receive first video content from the video source 302 and second video content from the character generator 308, and is to overlay the second video content on the first video content, thereby generating a modified version of the first video content.

In another example, a DVE template can specify that the DVE system 310 is to receive first video content from the video source 302 and second video content from the character generator 308, and is to scale-down and re-position the first video content and the second video content, each in a respective one of two windows positioned side-by-side. As such, the DVE system 310 can generate video content by scaling and/or re-positioning video content.

After the DVE system 310 generates and/or outputs the video content, the DVE system 310 can transmit the video content to another entity, such as the VBS 204, or can store the video content in a data storage unit (e.g., a data storage unit of the DVE system 310).

As such, in one example, the DVE system 310 can receive first video content including SM content, can use the first video content to generate and/or output second video content that includes the SM content. This is an example way in which the VPS 202 can integrate SM content into a video program.

The VPS 202 can also integrate SM content into a video program in other ways. For example, in the case where the video source 302 is a video camera, the SM system 306 can include a display device that is located within a field of the view of the video camera while the video camera records video content that serves as or is made part of the video program. In one example, the display device can be touch-enabled, which can allow a user (e.g., a news anchor) to interact with the SM content. To facilitate the user's interaction with the SM content, the display device and/or other components of the SM system 306 can be programmed with instructions that cause particular actions in response to particular touch commands.

In one example, the display device can initially display multiple small tiles, each representing a different SM content item. In this example, the SM contents can relate to weather conditions captured in photographs published on SM platforms by various different publishers. As such, each tile can display a different photograph. The position and ordering of the small tiles can be determined by a character generator template and/or a DVE template. Either template can also include programming instructions that can allow the commands provided via the touch screen display to cause predefined actions for the displayed SM content items. For example, if a meteorologist taps on one of the small items a first time, the programming instructions can cause the tile to expand to enlarge the photograph and perhaps display additional elements of, or information associated with, the SM content (e.g., a username, time, location, and/or text published in connection with the SM content). Other commands can cause an expanded tile to return to its initial size and position. As the meteorologist interacts with the SM contents displayed on the display device, the video camera can generate video content including these interactions and thereby integrate the SM contents into the video program.

The scheduling system 312 can perform various acts and/or functions related to the scheduling of video content production. For example, the scheduling system 312 can create and/or modify a program schedule of a video program, perhaps based on input received from a user via a user interface. Further, the scheduling system 312 can store and/or retrieve a program schedule, perhaps based on input received from a user via a user interface. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule. This can cause the sequencing system 314 to control one or more other components of the VPS 202 to facilitate the VPS 202 generating and/or outputting video content, which can serve as or be part of a video program. For example, the sequencing system 314 can control the video source 302, the SM system 306, the character generator 308, and/or the DVE system 310 to perform the various acts and/or functions described in this disclosure.

The sequencing system 314 can receive a program schedule in various ways. For example, the sequencing system 314 can do so by receiving it from another entity, such as the scheduling system 312. In another example, the character generator 308 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE identifier (which can serve as an instruction to execute the identified DVE).

A video content item can consist of logically-related video content. For example, a video content item can be a commercial. As another example, a video content item can be a portion of a television program that is scheduled between two commercial breaks. This is sometimes referred to in the industry as a "program segment."

As shown in FIG. 5, the first record specifies a story title of STORY A, a video content identifier of VCI ID A, a duration of 00:02:00:00 (in hours::minutes::seconds::frames format), and a script of SCRIPT A. In this example, SCRIPT A includes instructions for the video source 302 to playout a first video content item identified by the identifier VCI A for two minutes, instructions for the character generator 308 to use a live transmission of a SM content item to generate a third video content item that includes the SM content item, and instructions for the DVE system 310 to execute a particular DVE, which causes the DVE system 310 to overlay the generated third video content item on the generated first video content item to generate a fourth video content item.

The program schedule 500 has been greatly simplified for the purposes of illustrating certain features. In practice, a program schedule is likely to include significantly more data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, a SM server (or other computing system associated with a SM platform) can transmit SM video content to the VPS 202. The VPS 202 can then receive the SM video content and can integrate it to a video program. In some instances, the SM server can transmit the SM video content to the VPS 202 by transmitting a data stream representing the SM video content to the VPS. As such, the VPS 202 can receive the SM video content by receiving the data stream representing the SM video content.

In some instances though, the data stream can represent more than just the SM video content. For example, the data stream can also include an instruction configured to cause a computing system that receives the data stream to perform a particular operation, such as a content overlay operation. FIG. 600 is a simplified diagram of an example data stream 600, which can help illustrate this concept. In discussing the data stream 600, reference will be made to a computing system that receives and processes the data stream.

As shown, the data stream 600 includes at least seven blocks of data namely, a first block 602, a second block 604, a third block 606, a fourth block 608, a fifth block 610, a sixth block 612, and a seventh block 614. The computing system can receive the blocks in order from left to right, as shown. As such, the computing system can receive the first block 602, and then the second block 604, and so on.

The first block 602 includes data that indicates that data of a certain type (i.e., data representing video content) follows in a subsequent block. The second block 604 includes data representing a first part of SM video content. The third block 606 indicates that data of a certain type (i.e., data representing an overlay instruction) follows in a subsequent block. The fourth block 608 includes an instruction configured to cause the computing system to perform a content overlay operation. The fifth block 610 includes data that indicates that data of a certain type (i.e., data representing video content) follows in a subsequent block. The sixth block includes data representing a second part of the SM video content. The seventh block includes data of a certain type (i.e., data representing an overlay instruction) follows in a subsequent block.

By receiving the data in the second block 604 and in the sixth block 612, the computing system can use the data to render the represented video content (i.e., the SM video content) on a display component of the computing system. Responsive to receiving the data in the fourth block 608, the computing system can cause the computing system to overlay other content on the SM video content as it is being displayed. In one example, the instruction can cause the computing system to overlay content related to comments from other SM users. However, the overlay content can take other forms.

The data in the first block 602, the third block 606, the fifth block 610, and the seventh block 614 can allow the computing system to determine where the neighboring blocks begin and end. For example, the data in the first block 602 can allow the computing system to determine where the second block 604 begins. Similarly, the data in the third block 606 can allow the computing system to determine where the data in the second block 604 ends and where the data in the fourth block 608 begins, and so forth.

The computing system can determine that each of the first block 602, the third block 606, the fifth block 610, and the seventh block 614 includes data to be use for this purposes in various ways, such as by determining that the data has a particular characteristic (e.g., a pre-defined string of bits). The data includes in each of these blocks can includes various types of information to help the computing system determine the beginning and/or ending of the neighboring blocks. For example, the first block 602 can specify the size of the block in which it is contained. This can allow the computing system to use the data in the first block 602 to identify the start of the next block, which in this case, is the second block 604. Similarly, by determining that the third block 606 starts at a certain point, the computing system can determine that a position just prior to that point represents the end of the second block 604.

Although the VPS 202 can receive the entire data stream 600, in some instances, it can be desirable to integrate the represented SM video content, but not the overlay content, into a video program. This can help avoid certain undesirable situations. For example, if the overlay content is integrated in into the video program, it can potentially interfere with text or other content that may be overlaid on the video program by way of the DVE system 310 executing a DVE as described above. As such, to avoid this from happening, it can be desirable to integrate the SM video content, but not the overlay content, into the video program.

The VPS 202, the VBS 204, and/or components thereof can provide various acts and/or functions to allow the video content, but not the other content, to be integrated into the video program. These acts and/or functions and related features will now be discussed.

First, the SM system 306 can receive from a computing system associated with a SM platform, a data stream that includes a first portion and a second portion. The first portion can represent SM video content published by a SM user on the SM platform. As such, the first portion can be a combination of the second block 604 and the sixth block 612. The second portion can represent data other than SM content published by the SM user on the SM platform. As such, the second portion can be the fourth block 608.

In one example, the first portion can include a first sub-portion and a second sub-portion. As such, the first sub-portion can be the second block 604 and the second sub-portion can be the sixth block 612. The SM system 306 can receive the first sub-portion before receiving the second portion, and can receive the second portion before receiving the second sub-portion. As such, the SM system can receive the second block 604 before receiving the fourth block 608, which the SM system 306 can receive before receive the sixth block 612.

The SM system 306 can then extract the first portion from the received data stream. In one example, this can involve the SM system 306 identifying the first sub-portion, identifying the second sub-portion, extracting the identified first sub-portion from the received data stream, and extracting the identified second sub-portion from the received data stream. As such, the SM system 306 can identify the second block 604 and the sixth block 612, and can extract the second block 604 and the sixth block 612 from the data stream 600.

In one example, the SM system 306 can receive the first block 602 and the act of the SM system 306 identifying the second block 604 can include the SM system 306 using the received first block 602 to identify a starting point of the second block 604. In another example, the SM system 306 can receive the third block 606 and the act of SM system 306 identifying the second block 604 can include the SM system 306 using the received third block 606 to identify an ending point of the second block 604.

In another example, the SM system 306 can receive the fifth block 610 and the act of SM system 306 identifying the sixth block 612 can include the SM system 306 using the received fifth block 610 to identify a starting point of the sixth block 612. In another example, the SM system 306 can receive the seventh block 614 and the act of SM system 306 identifying the sixth block 612 can include the SM system 306 using the received seventh block 614 to identify an ending point of the sixth block 612.

After the SM system 306 extract the first portion from the received video content, the VPS 202 can then integrate the SM video content represented by the extracted first portion into a video program as discussed above. As such, the VPS 202 can use the extracted first portion of the received data stream to generate video content that includes the represented SM video content. Further, the VBS 204 can transmit the generated video content to the end-user device 206 for presentation of the generated video content to an end-user of the end-user device 206 as described above.

Figure 7:
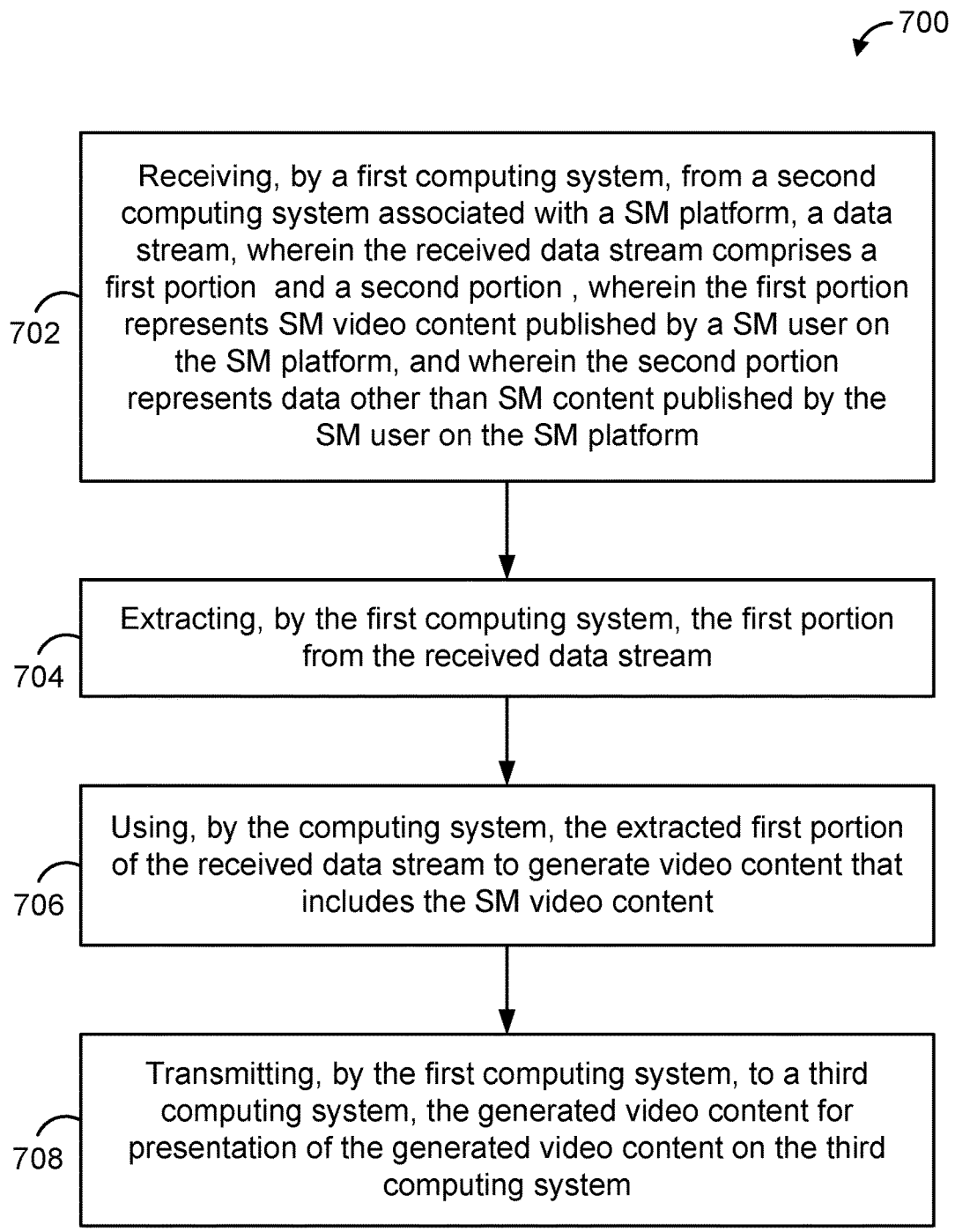
FIG. 7 is a flow chart of an example method.

FIG. 7 is a flow chart illustrating an example method 700.

At block 702, the method 700 can include receiving, by a first computing system, from a second computing system associated with a social media (SM) platform, a data stream, wherein the received data stream comprises a first portion and a second portion, wherein the first portion represents SM video content published by a SM user on the SM platform, and wherein the second portion represents data other than SM content published by the SM user on the SM platform. In one example, the first computing system can be a computing system that includes the VPS 202 and a VBS 204.

At block 704, the method 700 can include extracting, by the first computing system, the first portion from the received data stream.

At block 706, the method 700 can include using, by the computing system, the extracted first portion of the received data stream to generate video content that includes the SM video content.

At block 708, the method 700 can include transmitting, by the first computing system, to a third computing system, the generated video content for presentation of the generated video content on the third computing system. In one example, the second computing system can be the end-user device 206.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a first computing system comprising a video-production system (VPS) configured to facilitate production of a video program, the method comprising:

receiving, by the first computing system, from a second computing system associated with a social media (SM) platform, a data stream, wherein the received data stream comprises a first portion and a second portion, wherein the first portion represents SM video content published by a SM user on the SM platform, wherein the second portion represents data other than SM content published by the SM user on the SM platform, and wherein the second portion comprises an instruction to overlay supplemental content on the SM video content;

extracting, by the first computing system, the first portion from the received data stream;

from among the extracted first portion of the received data stream and the instruction to overlay the supplemental content, integrating, by the first computing system, only the extracted first portion of the received data stream into the video program to generate a video program that includes the SM video content; and transmitting, by the first computing system, to an end-user device, the generated video program for presentation of the generated video program on the end-user device.

2. The method of claim 1, wherein the first portion comprises a first sub-portion and a second sub-portion, wherein receiving the data stream comprises (i) receiving the first sub-portion before receiving the second portion, and (ii) receiving the second portion before receiving the second sub-portion.

3. The method of claim 2, wherein extracting the first portion from the received data stream comprises:

identifying the first sub-portion;

identifying the second sub-portion;

extracting the identified first sub-portion from the received data stream; and extracting the identified second sub-portion from the received data stream.

4. The method of claim 3, further comprising:

receiving a third portion of the received data stream before receiving the first sub-portion, wherein identifying the first sub-portion comprises using the received third portion to identify a starting point of the first sub-portion.

5. The method of claim 3, further comprising:

receiving a third portion of the received data stream after receiving the first sub-portion, wherein identifying the first sub-portion comprises using the received third portion to identify an ending point of the first sub-portion.

6. The method of claim 3, further comprising:

receiving a third portion of the received data stream before receiving the second sub-portion, wherein identifying the second sub-portion comprises using the received third portion to identify a starting point of the second sub-portion.

7. The method of claim 3, further comprising:

receiving a third portion of the received data stream after receiving the second sub-portion, wherein identifying the second sub-portion comprises using the received third portion to identify an ending point of the second sub-portion.

8. The method of claim 1, wherein transmitting the generated video program comprises transmitting the generated video program at our about the same time that the SM video content is captured by a video capturing device of a third computing system associated with the SM user.

9. The method of claim 1, wherein the supplemental content includes comments by other SM users on the SM video content.

10. A non-transitory computer-readable medium having stored thereon program instructions that upon execution by a processor, cause performance of a set of acts comprising:

receiving, by a first computing system comprising a video-production system (VPS) configured to facilitate production of a video program, from a second computing system associated with a social media (SM) platform, a data stream, wherein the received data stream comprises a first portion and a second portion, wherein the first portion represents SM video content published by a SM user on the SM platform, wherein the second portion represents data other than SM content published by the SM user on the SM platform, and wherein the second portion comprises an instruction to overlay supplemental content on the SM video content;

extracting, by the first computing system, the first portion from the received data stream;

from among the extracted first portion of the received data stream and the instruction to overlay the supplemental content, integrating, by the first computing system, only the extracted first portion of the received data stream into the video program to generate a video program that includes the SM video content; and transmitting, by the first computing system, to an end-user device, the generated video program for presentation of the generated video program on the end-user device.

11. The non-transitory computer-readable medium of claim 10, wherein the first portion comprises a first sub-portion and a second sub-portion, wherein receiving the data stream comprises (i) receiving the first sub-portion before receiving the second portion, and (ii) receiving the second portion before receiving the second sub-portion.

12. The non-transitory computer-readable medium of claim 11, wherein extracting the first portion from the received data stream comprises:

identifying the first sub-portion;

identifying the second sub-portion;

extracting the identified first sub-portion from the received data stream; and extracting the identified second sub-portion from the received data stream.

13. The non-transitory computer-readable medium of claim 12, the set of acts further comprising:

receiving a third portion of the received data stream before receiving the first sub-portion, wherein identifying the first sub-portion comprises using the received third portion to identify a starting point of the first sub-portion.

14. The non-transitory computer-readable medium of claim 12, the set of acts further comprising:

receiving a third portion of the received data stream after receiving the first sub-portion, wherein identifying the first sub-portion comprises using the received third portion to identify an ending point of the first sub-portion.

15. The non-transitory computer-readable medium of claim 12, the set of acts further comprising:

receiving a third portion of the received data stream before receiving the second sub-portion, wherein identifying the second sub-portion comprises using the received third portion to identify a starting point of the second sub-portion.

16. The non-transitory computer-readable medium of claim 12, the set of acts further comprising:

receiving a third portion of the received data stream after receiving the second sub-portion, wherein identifying the second sub-portion comprises using the received third portion to identify an ending point of the second sub-portion.

17. The non-transitory computer-readable medium of claim 12, wherein transmitting the generated video program comprises transmitting the generated video program at our about the same time that the SM video content is captured by a video capturing device of a third computing system associated with the SM user.

18. The non-transitory computer-readable medium of claim 10, wherein the supplemental content includes comments by other SM users on the SM video content.

19. A first computing system configured for performing a set of acts, wherein first computing system comprises a video-production system (VPS) configured to facilitate production of a video program, the set of acts comprising:
receiving, by the first computing system, from a second computing system associated with a social media (SM) platform, a data stream, wherein the received data stream comprises a first portion and a second portion, wherein the first portion represents SM video content published by a SM user on the SM platform, wherein the second portion represents data other than SM content published by the SM user on the SM platform, and wherein the second portion comprises an instruction to overlay supplemental content on the SM video content;
extracting, by the first computing system, the first portion from the received data stream;
from among the extracted first portion of the received data stream and the instruction to overlay the supplemental content, integrating, by the first computing system, only the extracted first portion of the received data stream into the video program to generate a video program that includes the SM video content; and
transmitting, by the first computing system, to an end-user device, the generated video program for presentation of the generated video program on the end-user device.

20. The first computing system of claim 19, wherein the supplemental content includes comments by other SM users on the SM video content.

* * * * *